F. N. CONNET.
METER.
APPLICATION FILED MAR. 24, 1910.
1,174,124.
Patented Mar. 7, 1916.
2 SHEETS—SHEET 2.
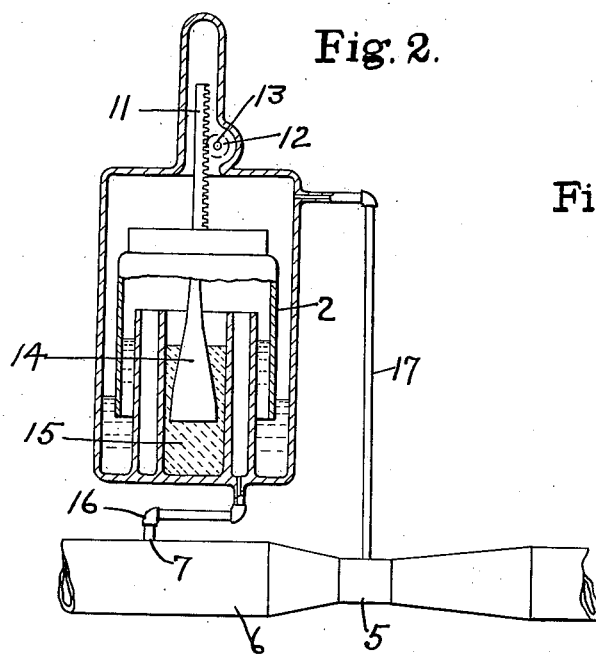
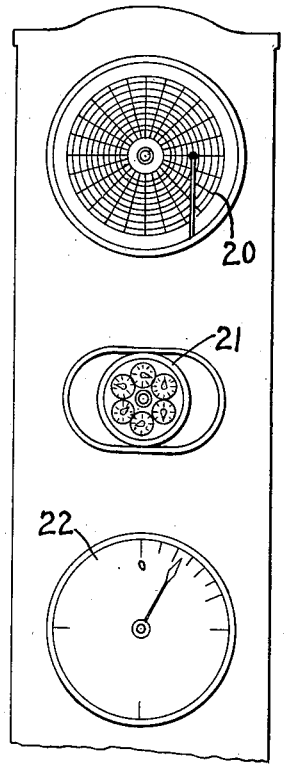
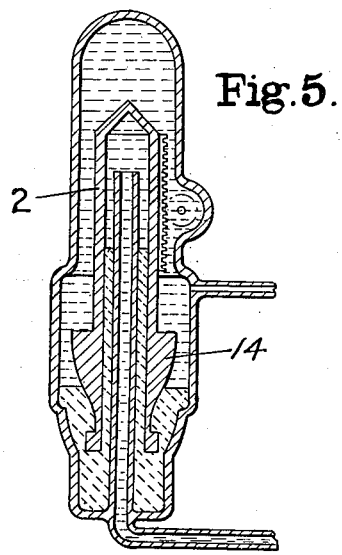
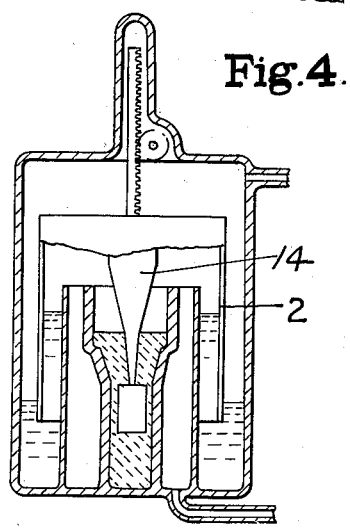
WITNESSES
E. D. Ogden
J. L. Macdermott
INVENTOR
Frederick N. Connet.
BY
Howard E. Barlow
ATTORNEY

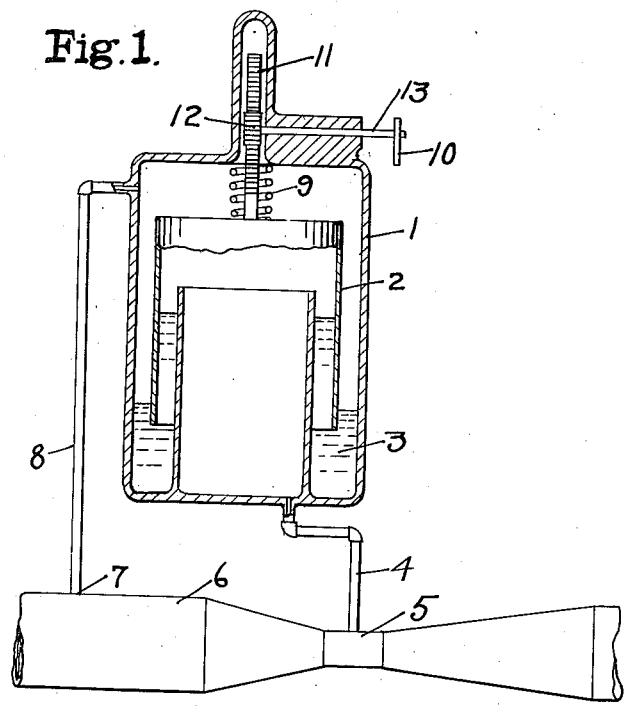
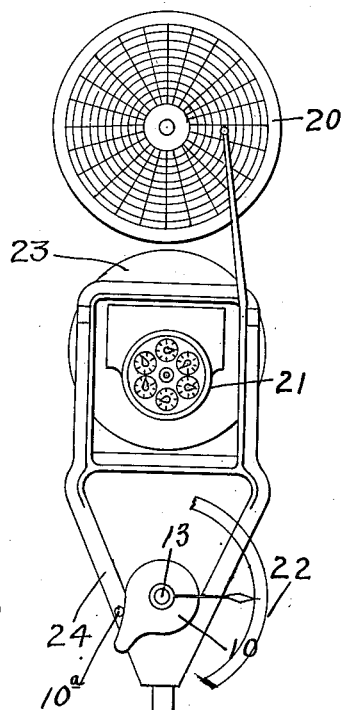
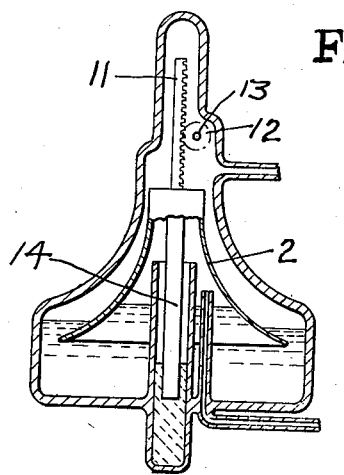
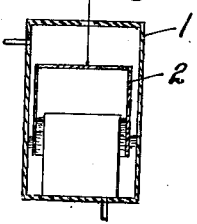

UNITED STATES PATENT OFFICE.

FREDERICK N. CONNET, OF PROVIDENCE, RHODE ISLAND.

METER.

1,174,124. Specification of Letters Patent. Patented Mar. 7, 1916.

Application filed March 24, 1910. Serial No. 551,349.

*To all whom it may concern:*

Be it known that I, FREDERICK N. CONNET, a citizen of the United States, residing at the city of Providence, in the county of Providence and State of Rhode Island, have invented certain new and useful Improvements in Meters, of which the following is a specification, reference being had therein to the accompanying drawing.

This invention relates to meters for measuring either gases or liquids, and is of the class of meter operating elements in which an inverted bell is actuated and controlled by the pressure from two distinct points of a Venturi tube, and the object of this invention is to provide means whereby a given change in the differential pressures in said tube may be caused to produce the required movement of the operating cam for the purpose of causing other means to show the amount which passes through the meter tube.

A further object of the invention is to provide simple means for effectively counterbalancing the inverted bell so that its vertical movement will give a proportional movement to the actuating cam.

In carrying out my invention I preferably employ a receptacle in which is mounted an inverted cup or bell arranged to dip into a liquid seal, and which cup is actuated by the difference between internal and external pressures. The weight of the bell is preferably counterbalanced by the action of a spring, or the same effect may be obtained by the employment of a suitable float secured to the bell and partially immersed in mercury or other liquid, said float being so shaped that the change in its buoyancy will compensate for the change in buoyancy of the bell due to its immersion.

With these and other objects in view, the invention consists of certain novel features of construction, as will be more fully described and particularly pointed out in the appended claims.

In the accompanying drawings: Figure 1— illustrates one element of a meter having an inverted bell, the interior of which is connected to the low pressure point in the Venturi-tube and the exterior to the high pressure point in said tube, the weight of said bell being balanced by means of a spring. Fig. 2— illustrates another form of meter element in which the interior of the inverted bell is connected to the high pressure point in the Venturi tube and the exterior to the low pressure point in said tube, said bell being balanced by means of a float. Fig. 3— illustrates another style of inverted bell and float in which the bell is flaring in form and the float is of a regular cylindrical form. Figs. 4 and 5— illustrate still another form in which the float is tapered downwardly and the bell is of a regular cylindrical form. Fig. 6— illustrates a recorder, a counter and an indicating device comprising showing means, all of which are controlled by the movement of the bell actuated cam. Fig. 7— is a front view of the manometer casing showing the faces of the different showing means. Fig. 8— illustrates the balancing of the bell by means of a balance weight on a cord passing over the pulley.

Referring to the drawings, 1 designates an outer closed bell casing in which is operatively mounted an inverted bell float or cup 2, which may be formed of any suitable material and of any desired size or shape, the lower edge of said cup being arranged to dip into suitable sealing liquid 3. The interior of this float is represented in Fig. 1 as communicating through pipe 4 to the throat or low pressure joint 5 in the Venturi tube 6, while the high pressure point 7 of the tube is shown as connecting through pipe 8 to the outer bell casing to permit this high pressure to act on the exterior of said bell.

In order to counterbalance the forces acting on this bell float when connected as above described, I preferably employ a compression spring 9 so arranged that the movement of said float, due to the differential pressures in said tube, will cause the desired movement of the actuating cam 10 through the rack 11, pinion 12 and short shaft 13. In some cases in practice the pressure connections are reversed bringing the high on the interior and the low on the exterior of said bell, as illustrated in Fig. 2, in which case a compensating tension spring 9 is used instead of a compression spring. When the meter is employed in measuring gases, the bell may be sealed by the use of oil, water or other liquids of low specific gravity, but when employed to measure flowing liquids, mercury is used for sealing the bell. In this latter case great economy is found in the employment of a single bell, (instead of the old method of using two coöperating bells or floats each having pressure on one side only), and operating this single bell by the combination of the internal and external pressures, as the narrow space between the walls of the well require but the minimum amount of mercury for sealing the bell.

In some cases it is found advantageous to employ a float 14 immersed in a well 15 of mercury for balancing the float. In Figs. 2, 4 and 5 the float 14 is tapered, and the bell 2 cylindrical, whereas in Fig. 3 the float is cylindrical and the bell is flaring in form. This latter form requires a much smaller quantity of mercury than do the others but on the other hand is harder to construct.

In Figs. 2, 3 and 4 the bell is preferably sealed by oil, water, or other light liquid in order to nullify as far as possible the buoyancy of the bell, and so, by enabling the central float to be made longer, to increase the range of the meter.

In Figs. 3, 4 and 5 the lower pressure, for instance the throat pressure from a Venturi tube, is led to the inside of the bell and an increase in the difference causes the bell to sink, but in Fig. 2 the higher or main pressure is led through pipe 16 to the inside of the bell, while the lower pressure is led from the throat of the tube through pipe 17 to the exterior of the bell, and an increase in the difference causes the bell to rise.

The weight of the bell and float may be supported by carrying floats 14, see Figs. 2, 4 and 5, or if preferred by means of balance weights on cords passing over pulleys 18, as shown in Fig. 8.

In Figs. 2, 3 and 4 a portion of the increase of buoyancy consequent on the descent of the moving part is due to the immersion of the bell. This may be compensated for as in the ordinary bells for measuring quantities of gas, by any other suitable equivalent mechanical device instead of the guide pulley and weight 18 shown in Fig. 8.

Fig. 5 shows an arrangement suitable for a water meter, the float 14 being so designed that movements in the Venturi head corresponding to equal increments of flow cause equal movements of the combined float and bell.

In all cases the movement of the bell may be communicated by the rack 11 and pinion 12 to a spindle 13, which passes to the outside of the casing 1, the movement of this spindle is conveyed through a cam 10, or other suitable equivalent gearing, to the showing means such as the recorder 20, counter 21 and indicator mechanism 22, illustrated in Figs. 6 and 7. In each case also the moving part should be carefully guided by suitable rollers (not shown) so that it may move with the least possible friction.

If desired a cam 10 and roller or pin 10ª may be interposed between the spindle 13 and the showing mechanism, as illustrated in Fig. 6. This has the advantage that the said mechanism may be readily calibrated since any inaccuracies may be easily corrected by altering the surface of the cam without interfering with the bell and float.

It will be seen that by giving a suitable shape to the float 14, or to the bell itself, the change in the difference of pressure can be caused to give to the pinion 12 any desired movement, such for instance as one proportional to the flow itself or to the logarithm of the flow.

In the mechanism illustrated in Fig. 6 both the recording disk 20 and the driving disk 23 are each independently and continuously rotated by clock work, or other convenient mechanism, not shown, and the frame 24 which carries all of the moving parts is illustrated and particularly described in my co-pending patent application Serial Number 452,750.

It will be observed that the casing 1 and the inverted bell 2 coöperate with the liquid in said casing to form two chambers so connected that the enlargement of one is at the expense of the other. The sole function of the wall of the bell is to determine the bounds of the two chambers one within and the other without the bell, said wall being movable to permit the enlargement of one chamber at the expense of the other as suggested.

Having thus described my invention, what I claim as new and desire to secure by Letters Patent, is:—

1. An improvement in meters comprising a casing, a liquid in said casing, and a movable wall, all coöperating to form two chambers with a liquid seal between them, either of said chambers being adapted to enlarge at the expense of the other, said movable wall being inclosed within said casing, exhibiting means actuated by said movable wall, and a movable body within said casing and moving independently of said wall, the latter being provided with means to displace said movable body to counterbalance the pressure exerted through and by gravity acting upon said movable wall.

2. An improvement in meters comprising a casing, a liquid in said casing, and a movable wall, all coöperating to form two chambers with a liquid seal between them, either of said chambers being adapted to enlarge at the expense of the other, said movable wall being inclosed within said casing, exhibiting means actuated by said movable wall, and a fluid in one of said chambers and independent of the sealing fluid, said movable wall being provided with means to displace said fluid to counterbalance the pressure exerted through and by gravity acting upon said movable wall.

3. An improvement in meters comprising a casing, a liquid in said casing, and a movable wall, all coöperating to form two chambers, either of said chambers being adapted to enlarge at the expense of the other, said movable wall being inclosed within said casing, exhibiting means actuated by said movable wall, and a fluid in one of said chambers, said movable wall being provided with a longitudinally tapered member immersed in said fluid to automatically counterbalance varying pressures exerted through and by gravity acting upon said wall.

4. An improvement in meters comprising a casing, a liquid in said casing, and a movable wall, all coöperating to form two chambers with a liquid seal between them, either of said chambers being adapted to enlarge at the expense of the other, said movable wall being inclosed within said casing, exhibiting means actuated by said movable wall, and a fluid in one of said chambers and independent of the sealing fluid, said movable wall being provided with a member immersed in said fluid to displace the same to counterbalance the pressure exerted through and by gravity acting upon said movable wall.

5. An improvement in meters comprising a closed casing having a fluid therein, an inverted bell inclosed within said casing and having its lower edge immersed in said fluid and adapted to be moved by differences in pressure, exhibiting means operated by said bell, and a body in said casing and movable independently of said movable bell, said bell being provided with means to displace said movable body to counterbalance the pressure exerted by and through gravity acting upon said bell.

6. An improvement in meters comprising a closed casing having a fluid therein, an inverted bell inclosed within said casing and having its lower edge immersed in said fluid and adapted to be moved by differences in pressure, exhibiting means operated by said bell, a second fluid within said casing, and a member connected to said bell and adapted to displace the second fluid to counterbalance the pressures exerted by and through gravity acting on said bell.

7. An improvement in meters comprising a closed casing having a fluid therein, an inverted bell having its lower edge immersed in said fluid and adapted to be moved by differences in pressure, exhibiting means operated by said bell, a second fluid within said casing, and a longitudinally tapered member carried by said bell and immersed in said second fluid for displacing the second fluid to counterbalance the pressures exerted by and through gravity acting on said bell.

In testimony whereof I affix my signature in presence of two witnesses.

FREDERICK N. CONNET.

Witnesses:
HOWARD E. BARLOW,
E. I. OGDEN.